US009894603B2

(12) United States Patent
Ueno et al.

(10) Patent No.: US 9,894,603 B2
(45) Date of Patent: Feb. 13, 2018

(54) ELECTRONIC EQUIPMENT, TERMINAL DEVICE, AND COMPUTER-READABLE RECORDING MEDIUM

(71) Applicant: SEIKO EPSON CORPORATION, Tokyo (JP)

(72) Inventors: Taichi Ueno, Nagano (JP); Kenji Sakuda, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/264,923

(22) Filed: Sep. 14, 2016

(65) Prior Publication Data
US 2017/0156110 A1    Jun. 1, 2017

(30) Foreign Application Priority Data

Nov. 30, 2015  (JP) ................................ 2015-233753

(51) Int. Cl.
| | |
|---|---|
| *H04W 76/00* | (2009.01) |
| *H04W 48/18* | (2009.01) |
| *H04W 4/00* | (2009.01) |
| *G06F 3/12* | (2006.01) |
| *H04W 76/02* | (2009.01) |

(52) U.S. Cl.
CPC .......... *H04W 48/18* (2013.01); *G06F 3/1292* (2013.01); *H04W 4/008* (2013.01); *G06F 3/1236* (2013.01); *H04W 76/023* (2013.01); *H04W 76/025* (2013.01)

(58) Field of Classification Search
CPC . H04W 4/008; H04W 76/023; H04W 76/025; H04W 88/06; G06F 3/1236; G06F 3/1292

USPC ..................................... 455/41.1, 41.2, 41.3
See application file for complete search history.

(56) References Cited

U.S. PATENT DOCUMENTS

| | | | | |
|---|---|---|---|---|
| 9,405,498 | B2* | 8/2016 | Nishi ...................... H04L 47/72 |
| 9,484,987 | B2* | 11/2016 | Nishi .................... H04B 5/0031 |
| 2008/0090595 | A1* | 4/2008 | Liu ........................ H04L 63/102 |
| | | | | 455/461 |
| 2011/0124286 | A1* | 5/2011 | Tanaka ................ H04W 76/023 |
| | | | | 455/41.1 |
| 2013/0201981 | A1* | 8/2013 | Niwa ................... H04W 76/043 |
| | | | | 370/338 |
| 2014/0240762 | A1* | 8/2014 | Shiraga ................. G06F 3/1206 |
| | | | | 358/1.15 |
| 2014/0279479 | A1* | 9/2014 | Maniar .................. G06Q 20/36 |
| | | | | 705/41 |

(Continued)

FOREIGN PATENT DOCUMENTS

JP          2015-070458 A       4/2015

*Primary Examiner* — Duc M Nguyen
(74) *Attorney, Agent, or Firm* — Global IP Counselors, LLP

(57) ABSTRACT

A wireless communication unit forms any one of a first wireless network and a second wireless network, and performs wireless communication with a terminal device. An NFC communication unit performs short distance wireless communication with a terminal device. A controller switches a network of the wireless communication, which is formed by the wireless communication unit, from the first wireless network to the second wireless network, in response to the short distance wireless communication with the terminal device in a case in which the wireless communication unit forms the first wireless network.

10 Claims, 9 Drawing Sheets

(56) References Cited

U.S. PATENT DOCUMENTS

| | | | |
|---|---|---|---|
| 2014/0293327 A1* | 10/2014 | Miyazaki | G06F 3/1236 358/1.15 |
| 2015/0049360 A1* | 2/2015 | Lee | G06F 3/1292 358/1.15 |
| 2015/0092231 A1* | 4/2015 | Shibata | G06F 3/1203 358/1.15 |
| 2015/0092607 A1 | 4/2015 | Ando | |
| 2015/0189023 A1* | 7/2015 | Kubota | H04L 67/141 455/7 |
| 2015/0193183 A1* | 7/2015 | Ichikawa | G06F 3/1292 358/1.15 |
| 2015/0215107 A1* | 7/2015 | Siomina | H04L 5/16 370/281 |
| 2015/0288832 A1* | 10/2015 | Naruse | G06F 3/1204 358/1.15 |
| 2015/0331649 A1* | 11/2015 | Kadota | G06F 3/1292 358/1.13 |
| 2016/0004490 A1* | 1/2016 | Nagatani | H04L 67/36 358/1.15 |
| 2016/0004497 A1* | 1/2016 | Nishi | H04L 47/72 358/1.15 |
| 2016/0006483 A1* | 1/2016 | Nishi | H04B 5/0031 455/41.1 |
| 2016/0128119 A1* | 5/2016 | Maheshwari | H04W 76/023 370/329 |
| 2016/0162239 A1* | 6/2016 | Suzuki | G06F 3/1296 358/1.15 |
| 2016/0328195 A1* | 11/2016 | Kadota | G06F 3/1292 |

* cited by examiner

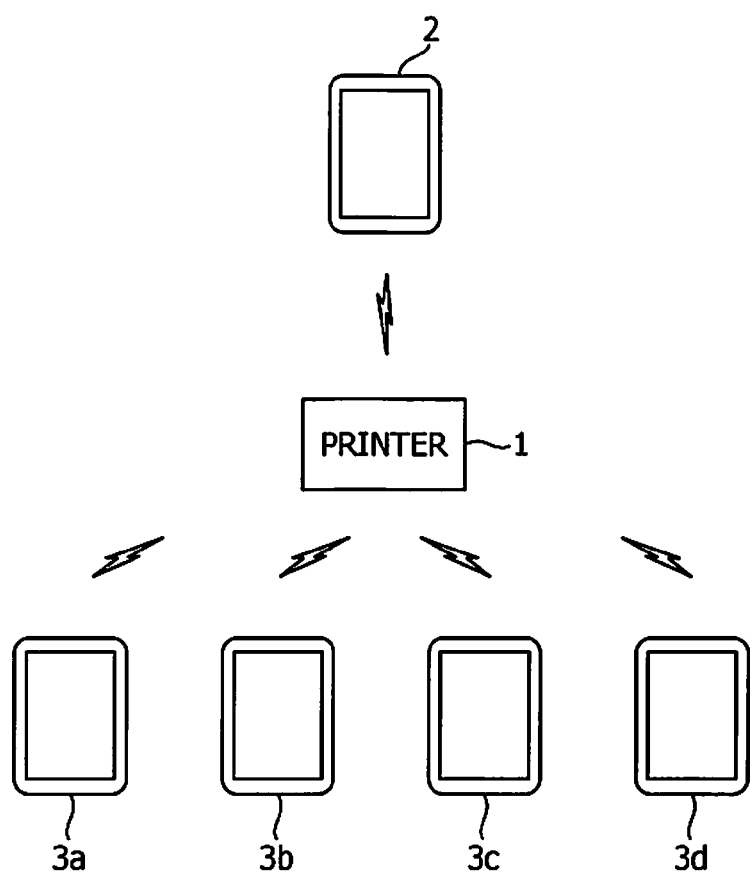

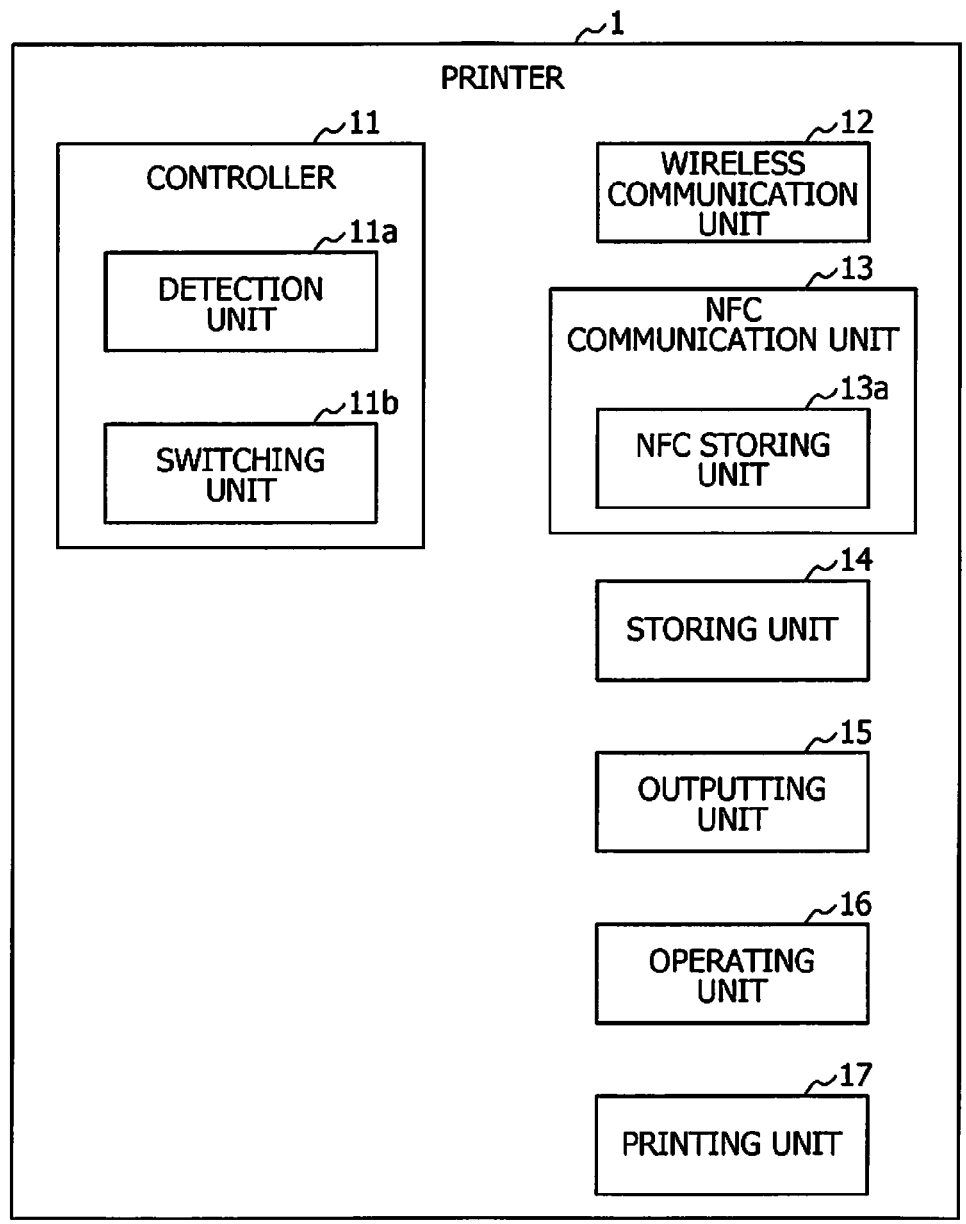

ELECTRONIC EQUIPMENT, TERMINAL DEVICE, AND COMPUTER-READABLE RECORDING MEDIUM

BACKGROUND

1. Technical Field

The present invention relates to electronic equipment, a terminal device, a wireless network switching method, a wireless communication connecting method, and a computer-readable recording medium.

This application claims priority to Japanese Application No. 2015-233753, filed Nov. 30, 2015, the entirety of which is incorporated by reference herein.

2. Related Art

In JP-A-2015-70458, a technology for wireless-communication between one communication equipment and a plurality of external equipment is disclosed.

In JP-A-2015-70458, a printer acquires the number of wireless connections in the wireless communication in response to a near field communication (NFC) with a target terminal. The printer allows the wireless connection of the target terminal in a case in which the acquired number of wireless connections is less than an upper limit number, and registers the target terminal to a waiting list in a case in which the acquired number of wireless connections is equal to the upper limit number. The printer performs the wireless communication with a terminal having a high order in the waiting list if the wireless communication becomes available, and performs the wireless communication with the target terminal when it becomes the target terminal's turn.

However, in the technology disclosed in JP-A-2015-70458, there is a problem in that in a case in which the number of wireless connections to the printer is equal to the upper limit number, the wireless connection between the target terminal and the printer cannot be performed immediately.

SUMMARY

An advantage of some aspects of the invention is to provide a technology of accepting the wireless connection of a specific terminal device, even when the number of wireless communications is equal to an upper limit connection number, in a case in which the wireless connection is requested by the terminal device.

According to a first aspect of the invention, there is provided electronic equipment including a wireless communication unit that forms any one of a first wireless network and a second wireless network, and performs wireless communication with a terminal device, a short distance wireless communication unit that performs short distance wireless communication with the terminal device, and a controller that switches a network of the wireless communication which is formed by the wireless communication unit from the first wireless network to the second wireless network in response to the short distance wireless communication with the terminal device in a case in which the wireless communication unit forms the first wireless network. According to the first aspect, in a case in which there is a wireless connection request by a specific terminal device, the electronic equipment is capable of reliably performing the wireless connection to the terminal device using the second wireless network since the first wireless network used so far is switched to the second wireless network.

In the electronic equipment, in the wireless communication unit, an upper limit connection number, which is the upper limit of the number of terminal devices with which the wireless communication unit can perform the wireless communication in the first wireless network, may present, and the controller may switch the first wireless network to the second wireless network in a case in which the number of connections is equal to the upper limit connection number. Accordingly, the electronic equipment can perform the wireless communication with the specific terminal device even when the number of wireless communications is equal to the upper limit connection number, since the first wireless network is switched to the second wireless network.

In the electronic equipment, the controller may switch the first wireless network to the second wireless network, in a case in which the number of connections is equal to the upper limit connection number, and a terminal device which performs the short distance wireless communication with the short distance wireless communication unit is a specific terminal device. Accordingly, in a case in which the terminal device performing the short distance wireless communication is the specific terminal device, the electronic equipment switches the first wireless network to the second wireless network, and thus the wireless communication can be performed with the specific terminal device.

In the electronic equipment, the short distance wireless communication unit may transmit first communication setting information for connection to the first wireless network, second communication setting information for connection to the second wireless network, and reference information indicating which of the first communication setting information and the second communication setting information needs to be referred to by the terminal device, to the terminal device. Accordingly, the terminal device can perform the wireless communication with the electronic equipment through the short distance wireless communication based on the information transmitted from the electronic equipment.

In the electronic equipment, the controller may set the reference information such that the terminal device is instructed to refer to the second communication setting information, in a case in which the number of connections is equal to the upper limit connection number. Accordingly, the terminal device is capable of using the communication setting information for wireless connection to the electronic equipment based on the reference information.

In the electronic equipment, the short distance wireless communication unit may transmit a switching time for switching from the first wireless network to the second wireless network to the terminal device. Accordingly, after elapsing the switching time, the terminal device can perform the wireless connection to the electronic equipment, and deteriorating of a power consumption can be suppressed.

In the electronic equipment, the controller may switch the second wireless network to the first wireless network, in a case in which the wireless communication with the terminal device in the second wireless network is disconnected. Accordingly, the terminal device which performs the wireless communication in the first wireless network is capable of restarting the wireless communication with the electronic equipment.

According to a second aspect of the invention, there is provided a terminal device including a wireless communication unit that performs wireless communication with electronic equipment a short distance wireless communication unit that receives first communication setting information for connection to a first wireless network formed by the electronic equipment, second communication setting information for connection to a second wireless network, and reference information indicating which of the first communication setting information and the second communication setting information needs to be referred to, from the electronic equipment through the short distance wireless communication, and a wireless communication controller that controls the wireless communication unit so as to perform the wireless connection to the electronic equipment using the first communication setting information in a case in which the reference information is information indicating referring to the first communication setting information, and controls the wireless communication unit so as to perform the wireless connection to the electronic equipment using the second communication setting information in a case in which the reference information is information indicating referring to the second communication setting information. According to the second aspect, the terminal device is capable of performing the wireless communication with the electronic equipment using any one of the first communication setting information and the second communication setting information transmitted from the electronic equipment.

According to a third aspect of the invention, there is provided a wireless network switching method in electronic equipment including a wireless communication unit which forms any one of a first wireless network and a second wireless network and performs wireless communication with a terminal device, and a short distance wireless communication unit which performs short distance wireless communication with the terminal device, the method including switching a network of the wireless communication formed by the wireless communication unit from the first wireless network to the second wireless network in response to the short distance wireless communication with the terminal device, in a case in which the wireless communication unit forms the first wireless network. According to the third aspect, in a case in which there is a wireless connection request by a specific terminal device, the electronic equipment is capable of reliably performing the wireless connection to the terminal device using the second wireless network since the first wireless network used so far is switched to the second wireless network.

According to a fourth aspect of the invention, there is provided a wireless communication connecting method including receiving first communication setting information for connection to a first wireless network formed by electronic equipment, second communication setting information for connection to a second wireless network, and reference information indicating which of the first communication setting information and the second communication setting information needs to be referred to, from the electronic equipment through short distance wireless communication, and controlling a wireless communication unit so as to perform wireless connection to the electronic equipment using the first communication setting information in a case in which the reference information is information indicating referring to the first communication setting information, and controlling the wireless communication unit so as to perform the wireless connection to the electronic equipment using the second communication setting information in a case in which the reference information is information indicating referring to the second communication setting information. According to the fourth aspect, the terminal device is capable of performing the wireless communication with the electronic equipment using any one of the first communication setting information and the second communication setting information transmitted from the electronic equipment.

According to a fifth aspect of the invention, there is provided a computer-readable recording medium storing a program which causes a computer to receive first communication setting information for connection to a first wireless network formed by electronic equipment, second communication setting information for connection to a second wireless network, and reference information indicating which of the first communication setting information and the second communication setting information needs to be referred to, from the electronic equipment through short distance wireless communication, and control a wireless communication unit so as to perform wireless connection to the electronic equipment using the first communication setting information in a case in which the reference information is information indicating referring to the first communication setting information, and control the wireless communication unit so as to perform the wireless connection to the electronic equipment using the second communication setting information in a case in which the reference information is information indicating referring to the second communication setting information. According to the fifth aspect, the terminal device is capable of performing the wireless communication with the electronic equipment using any one of the first communication setting information and the second communication setting information transmitted from the electronic equipment.

BRIEF DESCRIPTION OF THE DRAWINGS

The invention will be described with reference to the accompanying drawings, wherein like numbers reference like elements.

FIG. 1 is a diagram illustrating a configuration example of a wireless communication system according to a first embodiment of the invention.

FIG. 2 is a diagram illustrating a functional block configuration example of a printer.

FIG. 3 is a diagram illustrating a data configuration example of a storing unit.

DESCRIPTION OF EXEMPLARY EMBODIMENTS

Figure 4:
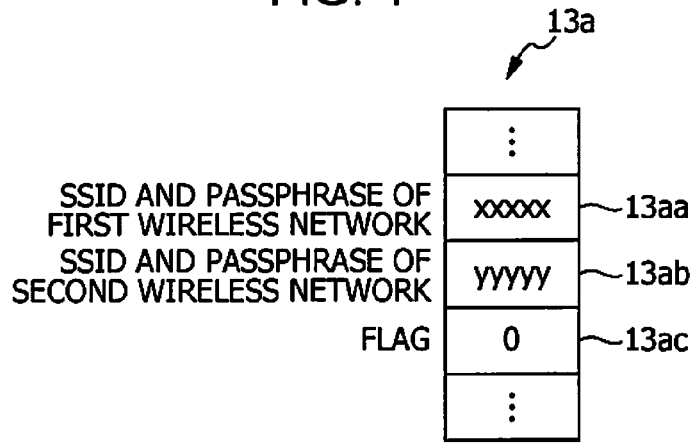
FIG. 4 is a diagram illustrating a data configuration example of an NFC storing unit.

Hereinafter, embodiments of the invention will be described with reference to drawings.

First Embodiment

FIG. 1 is a diagram illustrating a configuration example of a wireless communication system according to a first embodiment of the invention. As illustrated in FIG. 1, the wireless communication system includes a printer 1 (corresponding to electronic equipment of invention) and terminal devices 2, 3a, 3b, 3c, and 3d.

The printer 1 is a printer in which an NFC function is mounted. The printer 1 is capable of performing an NFC communication with the terminal devices 2, 3a, 3b, 3c, and 3d in which the NFC function is mounted.

In addition, the printer 1 is a printer which functions as a virtual access point (AP) and is capable of performing wireless connection (soft AP mode) based on a Wi-Fi manner. Hereinafter, this wireless connection is referred to as a direct connection.

In the direct connection, there is a upper limit connection number. For example, the printer 1 is capable of performing wireless communication with the maximum four terminal devices 2, 3a, 3b, 3c, and 3d by the direct connection.

The terminal devices 2, 3a, 3b, 3c, and 3d are a terminal device such as smart phones, tablet terminals, and mobile personal computers (PC). The terminal devices 2, 3a, 3b, 3c, and 3d are capable of performing the NFC communication with the printer 1, and performing the wireless communication (hereinafter, simply refer to wireless communication) by the direct connection.

The terminal device 2 is a terminal device which is used by, for example, a printer administrator. The terminal devices 3a to 3d are a terminal device which is used by, for example, a general user other than the printer administrator. The printer administrator and the general user NFC-touches (a part of the NFC communication of the terminal devices 2, 3a, 3b, 3c, and 3d are brought into contact with a part of the NFC communication of the printer 1, or are allowed to be closed near a part where the NFC communication is available) the terminal devices 2, 3a, 3b, 3c, and 3d to the printer 1 in a case of performing the wireless communication with the printer 1.

The terminal devices 2, 3a, 3b, 3c, and 3d receive communication setting information (for example, SSID and passphrase) for directly being connected to the printer 1 from the printer 1 by NFC-touching. Also, the terminal devices 2, 3a, 3b, 3c, and 3d performs the wireless communication with the printer 1 using the SSID and the passphrase received from the printer 1.

As described above, an upper limit connection number exists in the wireless communication of the printer 1. For this reason, when the printer 1 performs the wireless communication with a terminal device of the upper limit connection number (when the terminal device of the upper limit connection number is being wireless-connected to the printer 1), even when the printer administrator and the general user NFC-touches the terminal devices 2, 3a, 3b, 3c, and 3d to the printer 1, the terminal devices 2, 3a, 3b, 3c, and 3d are not capable of performing the wireless communication with the printer 1.

However, even when the printer 1 performs the wireless communication at the upper limit connection number, there is a case in which the printer administrator preferentially wants to perform the wireless communication with the printer 1 in order to set or manage the printer 1.

Here, information of the terminal device capable of preferentially performing the wireless communication with the printer 1 is registered in advance to the printer 1. For example, information of a terminal device 2 of the printer administrator is registered in advance to the printer 1.

Even when performing the wireless communication with the terminal devices 3a to 3d of the upper limit connection number, if the terminal device 2 which is registered in advance is NFC-touched, the printer 1 disconnects the wireless connection of the terminal devices 3a to 3d which are currently performing wireless communication. Also, the printer 1 forms the other wireless network which is capable of performing wireless communication (wireless connection) with the terminal device 2. For example, the printer 1 forms a wireless network (second wireless network) of the other SSID and passphrase, unlike the SSID and the passphrase of the current wireless network (first wireless network). Also, the terminal device 2 registered in advance wireless-connects with a second wireless network which is newly formed.

Accordingly, the printer administrator can perform the wireless communication with the printer 1 without waiting by a waiting list, or the like, even when the printer 1 performs the wireless communication with the terminal devices 3a to 3d of the upper limit connection number. Also, the printer administrator can directly set, manage, or the like of the printer 1.

Moreover, the printer 1 forms the original first wireless network, if the wireless communication of the terminal device 2 is finished. Accordingly, the terminal devices 3a to 3d are capable of performing the wireless communication with the printer 1 again.

FIG. 2 is a diagram illustrating a functional block configuration example of the printer 1. As illustrated in FIG. 2, the printer 1 includes a controller 11, a wireless communication unit 12, a NFC communication unit 13, a storing unit 14, an outputting unit 15, an operating unit 16, and a printing unit 17.

The controller 11 integratedly controls operations of the printer 1. It will be described in more detail hereinafter, but the controller 11 controls switching of the wireless network of the wireless communication unit 12.

The wireless communication unit 12 forms any one of the first wireless network and the second wireless network, and performs the wireless communication with the terminal devices 2, 3a, 3b, 3c, and 3d by the direct connection. In the wireless communication unit 12, there is an upper limit connection number by which the wireless communication can be performed with the terminal devices 2, 3a, 3b, 3c, and 3d, for example, the number is "four".

The wireless communication unit 12 is, for example, a communication module which is realized a communication function in conformity to a Wi-Fi standard and Wi-Fi direct standard which are a wireless local area network (LAN) standard. Since the direct connection of the wireless communication unit 12 is realized using a well-known technology, a detailed description will be omitted.

The NFC communication unit 13 performs the NFC communication in conformity to an NFC standard with the terminal devices 2, 3a, 3b, 3c, and 3d. Reading or writing of information, various communication modes, and the like by NFC, can be realized using various technologies, and thus a detailed description will be omitted.

As illustrated in FIG. 2, the NFC communication unit 13 includes a NFC storing unit 13a. Information stored in the NFC storing unit 13a is read by the terminal devices 2, 3a, 3b, 3c, and 3d. In addition, information is written on the NFC storing unit 13a by the terminal devices 2, 3a, 3b, 3c, and 3d. Accordingly, the printer 1 and the terminal devices 2, 3a, 3b, 3c, and 3d are capable of transmitting and receiving information with each other.

The storing unit 14 stores programs, data, and the like for performing a calculation process or a control process by the controller 11. In addition, the storing unit 14 stores programs, data, and the like for realizing a predetermined application function by the controller 11. Various programs, data, and the like may be stored in a non volatile recording medium in advance, or may be stored in the storing unit 14 when the controller 11 receives them from a server through a communication network. The storing unit 14 is configured with, for example, various integrated circuit (IC) memories such as a read only memory (ROM), a flash ROM, or a random access memory (RAM), and a recording medium such as a hard disc or a memory card, or the like.

The outputting unit 15 outputs a control result of the controller 11 to a display device such as a liquid crystal display (LCD) or an organic electro-luminescence display (OLED) as an image.

The operating unit 16 performs a process of acquiring operation data from a user from an input device such as keys, touch sensors, and touch panels, and transmitting the data to the controller 11.

The printing unit 17 forms an image on a printing medium according to an instruction from the controller 11. The printing unit 17 is, for example, an ink jet type printing engine, a laser type printing engine, or the like, and is configured with machine components, sensors, motors, driving circuits, control circuits, and the like.

The controller 11 includes a detection unit 11a and a switching unit 11b. A function of each of units of the controller 11 is realized by, for example, a central processing unit (CPU) which performs programs stored in the storing unit 14. Moreover, the function of each of the units of the controller 11 may be realized by a custom integrated circuit (IC) such as an application specific integrated circuit (ASIC), and may be realized by the CPU and the ASIC.

The detection unit 11a accesses the wireless communication unit 12, and detects how many devices of the terminal devices 2, 3a, 3b, 3c, and 3d are wireless-communicated with the wireless communication unit 12.

The switching unit 11b determines whether or not a connection number detected by the detection unit 11a is an upper limit connection number in response to NFC-touching of the terminal devices 2, 3a, 3b, 3c, and 3d. The switching unit 11b determines whether or not the terminal device NFC-touched is the terminal device 2 registered in advance, in a case of determining that the connection number detected the detection unit 11a is the upper limit connection number. Also, in a case of determining that the NFC-touched terminal device is the terminal device 2 registered in advance, the switching unit 11b switches the wireless network formed by the wireless communication unit 12 from the first wireless network to the second wireless network. That is, the switching unit 11b switches the wireless network to the second wireless network, if the printer 1 performs the wireless communication at the upper limit connection number, and the terminal device 2 of the printer administrator which is registered in advance is NFC-touched.

The storing unit 14 stores the identification information of the terminal device 2 of the printer administrator in advance in the printer 1.

FIG. 3 is a diagram illustrating a data configuration example of the storing unit 14. The storing unit 14 of the printer 1 stores the identification information of the terminal device 2 of the printer administrator in advance. For example, as illustrated in FIG. 3, the storing unit 14 stores a media access control (MAC) address of the terminal device 2 of the printer administrator.

As described above, the printer administrator and the general user NFC-touch the terminal devices 2, 3a, 3b, 3c, and 3d to the printer 1, when performing the wireless communication with the printer 1. At this time, the terminal devices 2, 3a, 3b, 3c, and 3d transmit a MAC address themselves to the printer 1 by the NFC communication. The switching unit 11b determines whether or not the terminal device, which is NFC-touched is the terminal device 2 registered in advance by comparing a MAC address transmitted by the NFC communication with a MAC address stored in the storing unit 14.

The NFC storing unit 13a of the NFC communication unit 13 stores the communication setting information for performing the wireless communication with the printer 1 by the terminal devices 2, 3a, 3b, 3c, and 3d.

FIG. 4 is a diagram illustrating a data configuration example of the NFC storing unit 13a. As illustrated in FIG. 4, the SSID and the passphrase of the first wireless network are stored in a storage region 13aa of the NFC storing unit 13a. The SSID and the passphrase of the second wireless network are stored in a storage region 13ab of the NFC storing unit 13a.

In a storage region 13ac of the NFC storing unit 13a, a flag (corresponding to reference information of the invention) is stored, which indicates whether the terminal devices 2, 3a, 3b, 3c, and 3d need to perform wireless connection on the first wireless network using the SSID and the passphrase of the first wireless network, or need to perform wireless connection on the second wireless network using the SSID and the passphrase of the second wireless network.

A flag of the storage region 13ac is written by the detection unit 11a. For example, the detection unit 11a writes a flag "zero", in a case in which a connection number of the terminal devices 3a to 3d, which perform the wireless communication in the first wireless network is less than the upper limit connection number. The detection unit 11a writes a flag "one", in a case in which a connection number of the terminal devices 3a to 3d, which perform the wireless communication in the first wireless network is the upper limit connection number.

As described above, the printer administrator NFC-touches the terminal device 2 to the printer 1, in a case of performing the wireless communication with the printer 1. The terminal device 2 reads information stored in the storage regions 13aa to 13ac of the NFC storing unit 13a, when being NFC-touched to the printer 1.

The terminal device 2 wireless-connects to the first wireless network using the SSID and the passphrase of the first wireless network of the SSID and the passphrase of two wireless networks which are read, in a case in which the read flag is "zero" (that is, the connection number is less than the upper limit connection number). Meanwhile, in a case in which the read flag is "one" (that is, the connection number is the upper limit connection number), the terminal device 2 wireless-connects to the first wireless network using the SSID and the passphrase of the second wireless network of the SSID and the passphrase of two wireless networks which are read.

In the same way, the terminal devices $3a$ to $3d$ of the general user read information stored in the storage regions $13aa$ to $13ac$ of the NFC storing unit $13a$ when being NFC-touched to the printer 1. Also, the terminal devices $3a$ to $3d$ wireless-connect to the printer 1 using any one of the SSID and the passphrase of the first wireless network and the second wireless network with reference to a flag read by the printer 1.

Figure 5:
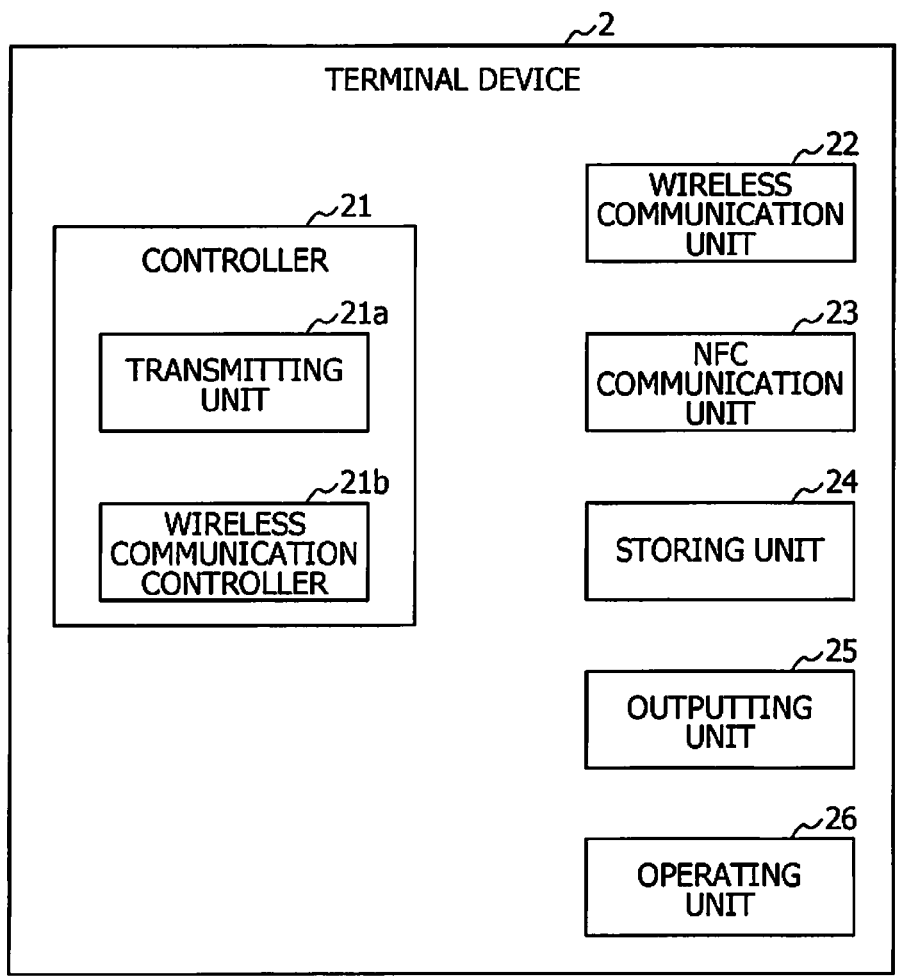
FIG. 5 is a diagram illustrating a functional block configuration example of a terminal device.

FIG. 5 is a diagram illustrating a functional block configuration example of the terminal device 2. As illustrated in FIG. 5, the terminal device 2 includes a controller 21, a wireless communication unit 22, a NFC communication unit 23, a storing unit 24, an outputting unit 25, and an operating unit 26.

The controller 21 integratedly controls operations of the terminal device 2. It will be described in more detail hereinafter, but the controller 21 controls connection to the first wireless network and the second wireless network formed by the printer 1. The controller 21 realizes a function thereof by the CPU. Moreover, the function of the controller 21 may be realized by a custom IC such as an ASIC, and may be realized by the CPU and the ASIC.

The wireless communication unit 22 performs the wireless communication by a direct connection with the printer 1 through the first wireless network and the second wireless network formed by the printer 1. The wireless communication unit 22 is a communication module that realizes a communication function in conformity to a Wi-Fi standard and Wi-Fi direct standard, which are a wireless LAN standard, in the same way of the wireless communication unit 12 of FIG. 2.

The NFC communication unit 23 performs the NFC communication with the printer 1 in conformity to the NFC standard. The NFC communication unit 23 writes information with respect to the NFC storing unit $13a$ of the printer 1 by the NFC communication, and reads the information stored in the NFC storing unit $13a$. Reading or writing of the information, various communication modes, and the like by the NFC can be realized by a well known technology, and thus detail description thereof will be omitted.

The storing unit 24 stores programs, data, and the like for performing a calculating process or a control process by the controller 21. In addition, the storing unit 24 stores programs, data, and the like for realizing a predetermined application function by the controller 21.

The outputting unit 25 outputs a control result of the controller 21 to a display device such as a liquid crystal display (LCD) or an organic electro-luminescence display (OLED) as an image.

The operating unit 26 performs a process of acquiring operation data from a user from an input device such as keys, touch sensors, and touch panels, and transmitting the data to the controller 21.

the controller 21 includes a transmitting unit $21a$ and a wireless communication controller $21b$. The transmitting unit $21a$ transmits the identification information of the terminal device 2 to the printer 1 through the NFC communication unit 23 when the terminal device 2 is NFC-touched to the printer 1. For example, the transmitting unit $21a$ transmits a MAC address of the terminal device 2 to the printer 1 through the NFC communication unit 23.

The NFC communication unit 23 reads the information (refer to FIG. 4) stored in the storage regions $13aa$ to $13ac$ of the NFC storing unit $13a$ of the printer 1, when the terminal device 2 is NFC-touched to the printer 1. In a case in which a flag read by the NFC communication unit 23 is "zero", the wireless communication controller $21b$ of the controller 21 controls the wireless communication unit 22 using the SSID and the passphrase of the first wireless network read by the NFC communication unit 23, so as to wireless-connect to the printer 1. Meanwhile, in a case in which a flag read by the NFC communication unit 23 is "one", the wireless communication controller $21b$ controls the wireless communication unit 22 using the SSID and the passphrase of the second wireless network read by the NFC communication unit 23, so as to wireless-connect to the printer 1.

Moreover, the terminal devices $3a$ to $3d$ of the general user also include functional blocks same as that of FIG. 5. Hereinafter, when each functional unit of the terminal device of the general user is described, a numeral of each functional unit of the terminal device 2 of FIG. 5 may be used.

Operation examples of the wireless communication system will be described. Operation of the wireless communication system is divided into two, according to whether or not the printer 1 performs wireless communication with the terminal devices $3a$ to $3d$ of the upper limit connection number. First, an operation in a case in which the printer 1 performs wireless communication with the terminal devices 2, $3a$, $3b$, $3c$, and $3d$ less than the upper limit connection number will be described. After that, an operation in a case in which the printer 1 performs wireless communication with the terminal devices $3a$ to $3d$ of the upper limit connection number will be described.

Figure 6:
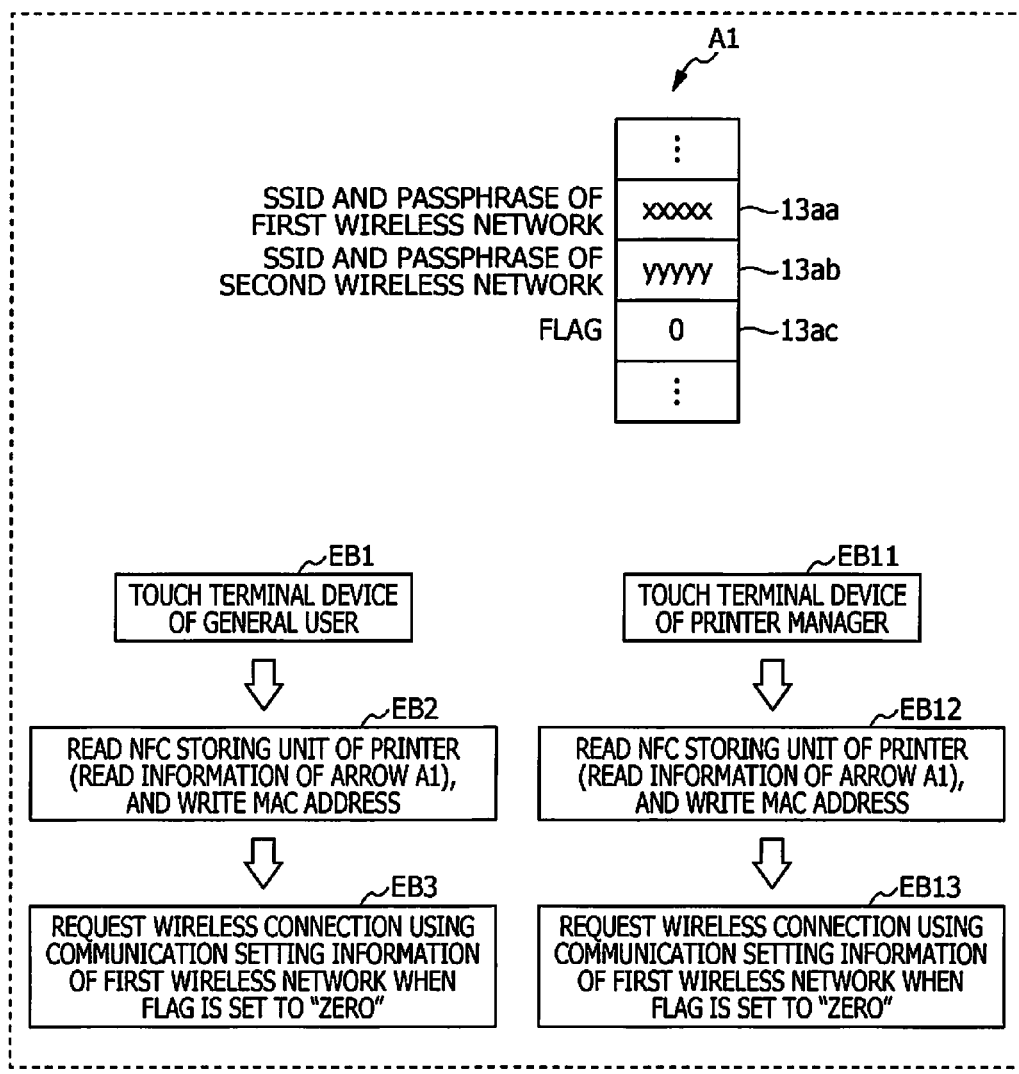
FIG. 6 is a diagram describing an operation example of the wireless communication system in a case in which the printer performs a wireless communication with a smaller number of terminal devices than an upper limit connection number.

FIG. 6 is a diagram describing an operation example of the wireless communication system in a case in which the printer 1 performs wireless communication with the terminal devices $3a$ to $3d$ less than the upper limit connection number. In an arrow A1 of FIG. 6, the NFC storing unit $13a$ of the printer 1 illustrated in FIG. 4 is illustrated.

The printer 1 performs wireless communication with (any one of) the terminal devices $3a$ to $3d$ less than the upper limit connection number. Accordingly, as illustrated in the arrow A1 of FIG. 6, in the storage region $13ac$ of the NFC storing unit $13a$ of the printer 1, the flag "zero" is stored by the detection unit $11a$.

In addition, the printer 1 performs the wireless communication with the terminal devices $3a$ to $3d$ less than the upper limit connection number. Accordingly, the wireless network, which is formed by the wireless communication unit 12 of the printer 1, is the first wireless network (the second wireless network is formed when the printer 1 performs wireless communication at the upper limit connection number, and the terminal device 2 registered in advance is NFC-touched).

Hereinafter, a case in which the general user NFC-touches the terminal device to the printer 1 (description blocks EB1 to EB3), and a case in which the printer administrator NFC-touches the terminal device 2 to the printer 1 (description blocks EB11 to EB13) will be separately described.

First, a case in which the general user NFC-touches the terminal device to the printer 1 will be described.

The general user NFC-touches the terminal device to the printer 1 (EB1) in order to perform the wireless communication with the printer 1.

The NFC communication unit 23 of the terminal device of the general user reads the information of the NFC storing unit $13a$ of the printer 1 illustrated by the arrow A1 by being NFC-touched to the printer 1, and writes the MAC address of the terminal device to a predetermined storage region (not illustrated in FIG. 4 and FIG. 6) of the NFC storing unit 13a (EB2).

The wireless communication unit 22 of the terminal device of the general user requests the wireless connection to the printer 1 using the SSID and the passphrase of the first wireless network read from the NFC storing unit 13a of the printer 1, because the flag read from the NFC storing unit 13a of the printer 1 is "zero" (refer to storage region 13ac of arrow A1) (EB3).

As described above, the wireless network, which is formed by the wireless communication unit 12 of the printer 1, is the first wireless network. Accordingly, the wireless communication unit 22 of the terminal device of the general user is capable of performing the wireless communication with the printer 1 by requesting the wireless connection described in the description block EB3.

Moreover, it will be described hereinafter, but the switching unit 11b performs a comparison process of the MAC address, in a case in which the connection number of the printer 1 is the upper limit connection number (refer to Steps S12 and S13 of FIG. 9). In this case, since the connection number is less than the upper limit connection number, the switching unit 11b does not perform the comparison process of the MAC address written in the description block EB2.

Next, a case in which the printer administrator NFC-touches the terminal device 2 to the printer 1 will be described.

The printer administrator NFC-touches the terminal device 2 to the printer 1 (EB11) in order to perform the wireless communication with the printer 1.

The NFC communication unit 23 of the terminal device 2 reads the information of the NFC storing unit 13a of the printer 1 illustrated by the arrow A1 by being NFC-touched to the printer 1, and writes the MAC address of the terminal device 2 to the storage region of the NFC storing unit 13a (EB12).

Since the flag read from the NFC storing unit 13a of the printer 1 is "zero" (refer to storage region 13ac of arrow A1), the wireless communication unit 12 of the terminal device 2 requests the wireless connection to the printer 1 using the SSID and the passphrase of the first wireless network read from the NFC storing unit 13a of the printer 1 (EB13).

As described above, the wireless network which is formed by the wireless communication unit 12 of the printer 1 is the first wireless network. Accordingly, the wireless communication unit 22 of the terminal device 2 is capable of performing the wireless communication with the printer 1 by the wireless connection described in the description block EB13.

Moreover, it will be described hereinafter, but the switching unit 11b performs the comparison process of the MAC address, in a case in which the connection number of the printer 1 is the upper limit connection number (refer to Steps S12 and S13 of FIG. 9). In this case, since the connection number is less than the upper limit connection number, the switching unit 11b does not perform the comparison process of the MAC address which is written in the description block EB12.

Next, an operation in which the printer 1 performs the wireless communication with the terminal devices 3a to 3d of the upper limit connection number will be described.

Figure 7:
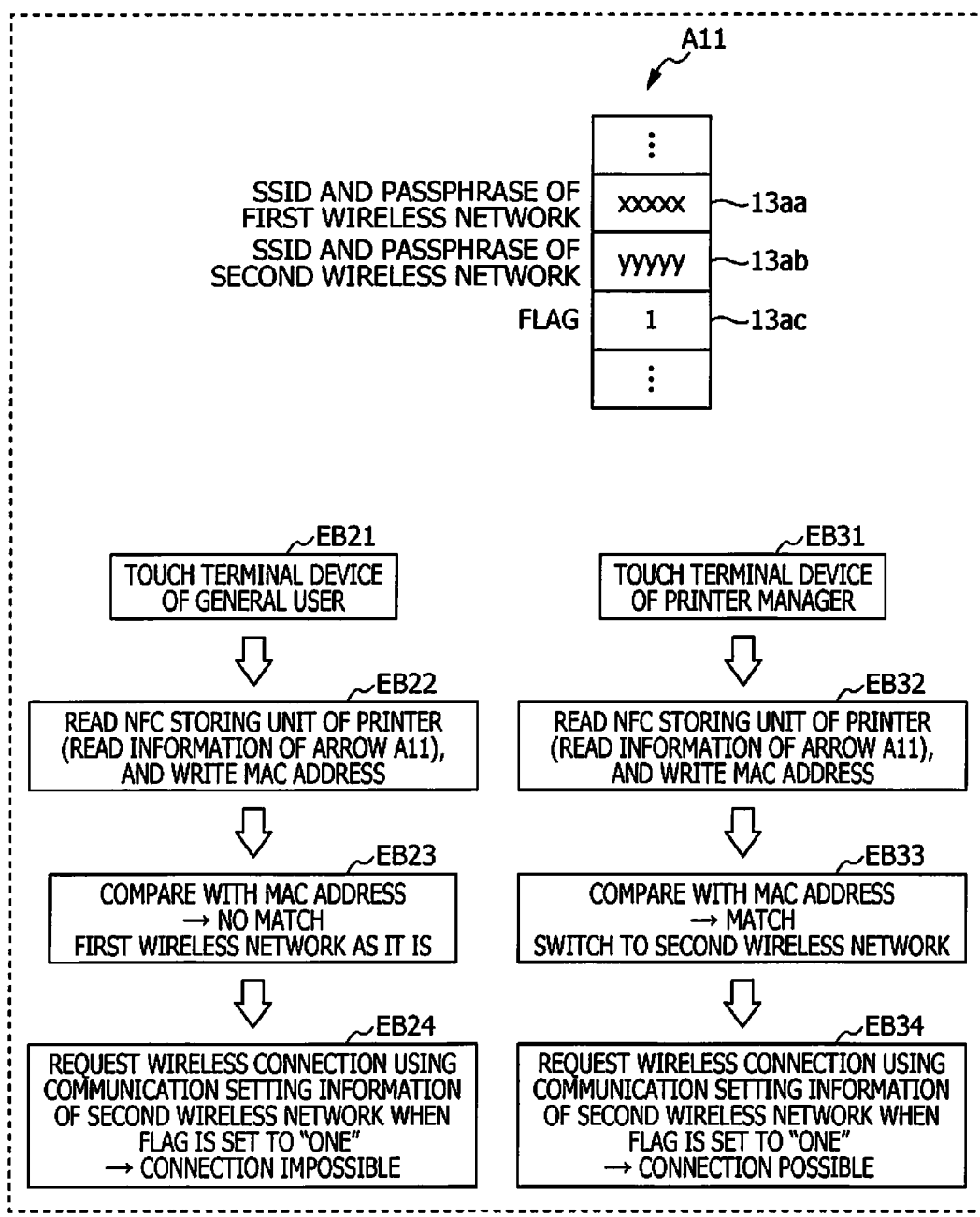
FIG. 7 is a diagram describing an operation example of the wireless communication system in a case in which the printer performs wireless communication with the same number of terminal devices as the upper limit connection number.

FIG. 7 is a diagram describing an operation example of the wireless communication system in a case in which the printer 1 performs the wireless communication with the terminal devices 3a to 3d of the upper limit connection number. In the arrow A1 of FIG. 7, the NFC storing unit 13a described in FIG. 4 is illustrated.

The printer 1 performs the wireless communication with the terminal devices 3a to 3d of the upper limit connection number. Accordingly, as illustrated in the arrow A11 of FIG. 7, in the storage region 13ac of the NFC storing unit 13a, by the detection unit 11a, the flag "one" is stored.

In addition, the printer 1 performs the wireless communication with the terminal devices 3a to 3d of the upper limit connection number. Accordingly, the wireless network which is formed by the wireless communication unit 12 of the printer 1 is the first wireless network (the second wireless network is formed when the printer 1 performs the wireless communication at the upper limit connection number, and the terminal device 2 registered in advance is NFC-touched as the description block EB31 to be described hereinafter).

Hereinafter, a case in which the general user NFC-touches the terminal device to the printer 1 (description blocks EB21 to EB24), and a case in which the printer administrator NFC-touches the terminal device 2 to the printer 1 (description blocks EB31 to EB34 will be separately described).

The general user NFC-touches the terminal device to the printer 1 in order to perform the wireless communication with the printer 1 (EB21).

The NFC communication unit 23 of the terminal device of the general user reads the information of the NFC storing unit 13a of the printer 1 illustrated in the arrow A11 by NFC-touching to the printer 1, and writes the MAC address of the terminal device to a predetermined storage region (not illustrated in FIG. 4 and FIG. 7) of the NFC storing unit 13a (EB22).

The switching unit 11b of the printer 1 compares the MAC address written in the NFC storing unit 13a, and the MAC address stored in the storing unit 14 (EB23). Since the MAC address written in the NFC storing unit 13a is not the MAC address of the terminal device 2 registered in advance, the switching unit 11b determines that the MAC addresses are not matched. Also, the switching unit 11b does not switch the wireless network formed by the wireless communication unit 12 to the second wireless network (first wireless network as it is).

The wireless communication unit 22 of the terminal device of the general user requests the wireless connection to the printer 1 using the SSID and the passphrase of the second wireless network read from the NFC storing unit 13a of the printer 1, because the flag read by the NFC communication unit 23 is "one" (refer to storage region 13ac of arrow A11). However, as described in the description block EB23, since the wireless network formed by the wireless communication unit 12 of the printer 1 is the first wireless network as it is, the wireless communication unit 22 of the terminal device of the general user cannot perform the wireless communication with the printer 1 (EB24).

Next, a case in which the printer administrator NFC-touches the terminal device 2 to the printer 1 will be described.

The printer administrator NFC-touches the terminal device 2 to the printer 1 in order to perform the wireless communication with the printer 1 (EB31).

The NFC communication unit 13 of the terminal device 2 reads the information of the NFC storing unit 13a of the printer 1 illustrated in the arrow A11 by being NFC-touched to the printer 1, and writes the MAC address of the terminal device 2 to a predetermined storage region of the NFC storing unit 13a (EB32).

The switching unit 11b of the printer 1 compares the MAC address written in the NFC storing unit 13a and the MAC address stored in the storing unit 14. Since the MAC address written in the NFC storing unit 13*a* is the MAC address of the terminal device 2 registered in advance, the switching unit 11*b* determines that the MAC addresses are matched. Also, the switching unit 11*b* switches the wireless network formed by the wireless communication unit 12 to the second wireless network (EB33).

Since the flag read from the NFC storing unit 13*a* of the printer 1 is "one", the wireless communication unit 12 of the terminal device 2 requests the wireless connection to the printer 1 using the SSID and the passphrase of the second wireless network read from the NFC storing unit 13*a* of the printer 1 (EB34).

Here, as described in the description block EB33, the wireless network formed by the printer 1 switches the first wireless network to the second wireless network by the switching unit 11*b*. Accordingly, the terminal device 2 is capable of performing the wireless communication with the printer 1.

In this manner, even when the printer 1 performs the wireless communication at the upper limit connection number, the terminal device 2 of the printer administrator is capable of performing the wireless communication with the printer 1 by NFC-touching to the printer 1 in the second wireless network different from the first wireless network. Meanwhile, the terminal device of the general user cannot perform the wireless communication with the printer 1 even when being NFC-touched to the printer 1, when the printer 1 performs the wireless communication at the upper limit connection number.

Moreover, even when the general user NFC-touches the terminal device to the printer 1 after the terminal device 2 establishes the wireless connection with the second wireless network, the terminal device of the general user cannot perform the wireless connection on the second wireless network. The reason is because the connection number of the printer 1 is "one" after the terminal device 2 establishes the wireless connection with the second wireless network, and a flag of the NFC storing unit 13*a* becomes "zero". Also, the terminal device of the general user which is NFC-touched is used for the wireless connection to the second wireless network using the SSID and the passphrase of the first wireless network by the flag "zero".

Figure 8:
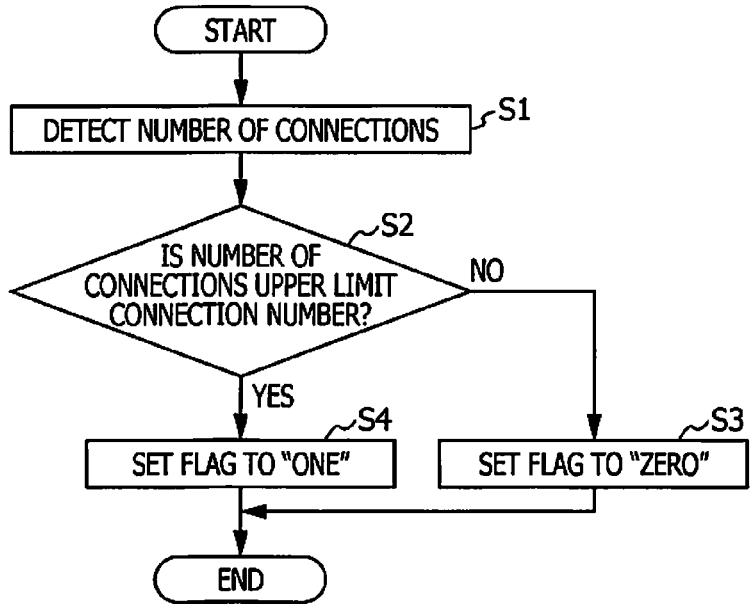
FIG. 8 is a flow chart illustrating an operation example of a detection unit of the printer.

FIG. 8 is a flow chart illustrating an operation example of the detection unit 11*a* of the printer 1. The detection unit 11*a* of the printer 1, for example, performs periodically a process of a flow chart of FIG. 8. A processing period of the detection unit 11*a* is shorter than an interval of touching, when a case in which at least the terminal devices 2, 3*a*, 3*b*, 3*c*, and 3*d* are NFC-touched successively is assumed.

First, the detection unit 11*a* accesses the wireless communication unit 12, and detects how many the terminal devices are wireless-communicated by the wireless communication unit 12 (Step S1).

Next, the detection unit 11*a* determines whether or not the connection number detected in Step S1 is the upper limit connection number (Step S2). The detection unit 11*a* moves a process to Step S4 in a case in which it is determined that the connection number detected in Step S1 is the upper limit connection number ("YES" of S2). The detection unit 11*a* moves the process to Step S3, in a case in which it is determined that the connection number detected in Step S1 is not the upper limit connection number ("NO" of S2).

In Step S2, in a case in which it is determined that the connection number detected in Step S1 is not the upper limit connection number ("No" of S2), the detection unit 11*a* sets the flag of the storage region 13*ac* of the NFC storing unit 13*a* to "zero" (Step S3). Also, the detection unit 11*a* finishes the process of the flow chart.

Meanwhile, in Step S2, in a case in which it is determined that the connection number detected in Step S1 is the upper limit connection number ("Yes" of S2), the detection unit 11*a* sets the flag of the storage region 13*ac* of the NFC storing unit 13*a* to "one" (Step S4). Also, the detection unit 11*a* finishes the process of the flow chart.

Moreover, the detection unit 11*a* may perform a process of the flow chart illustrated in FIG. 8, in response to NFC-touching of the terminal devices 2, 3*a*, 3*b*, 3*c*, and 3*d*. In this case, the detection unit 11*a* sets a flag in the NFC storing unit 13*a*, before the terminal devices 2, 3*a*, 3*b*, 3*c*, and 3*d* read information of the NFC storing unit 13*a*.

Figure 9:
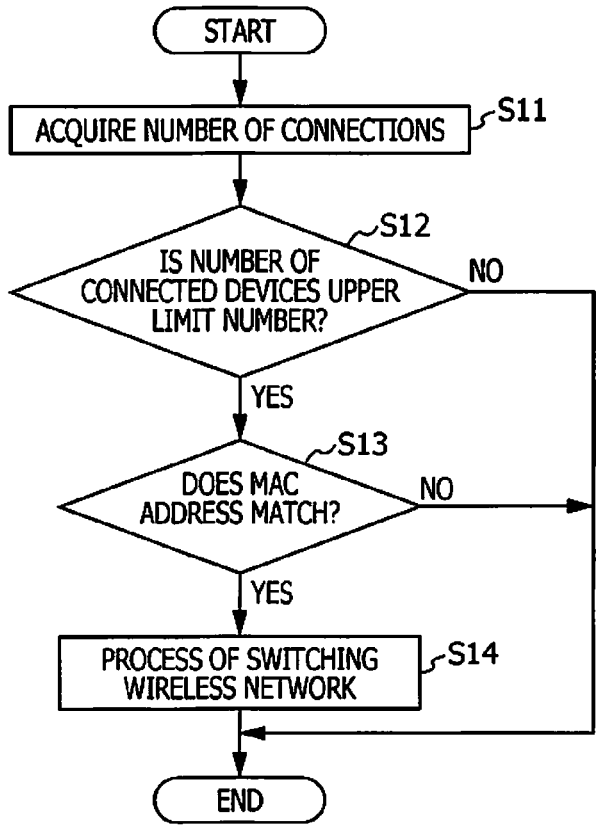
FIG. 9 is a first flow chart illustrating an operation example of a switching unit and a wireless communication unit of the printer.

FIG. 9 is a first flow chart illustrating an operation example of the switching unit 11*b* and the wireless communication unit 12 of the printer 1. The switching unit 11*b* and the wireless communication unit 12 of the printer 1 perform a process of the flow chart of FIG. 9, in response to NFC-touching of the terminal devices 2, 3*a*, 3*b*, 3*c*, and 3*d*. Moreover, the NFC communication unit 13 of the printer 1 receives the MAC address from the terminal devices 2, 3*a*, 3*b*, 3*c*, and 3*d* by NFC-touching of the terminal devices 2, 3*a*, 3*b*, 3*c*, and 3*d*.

First, the switching unit 11*b* acquires the connection number of the wireless communication unit 12, which is detected by the detection unit 11*a* (Step S11).

Next, the switching unit 11*b* determines whether or not the connection number acquired in Step S11 is the upper limit connection number (Step S12). In a case in which it is determined that the connection number acquired in Step S11 is the upper limit connection number ("Yes" of S12), the switching unit 11*b* moves the process to Step S13. The switching unit 11*b* finishes the process of the flow chart, in a case in which it is determined that the connection number acquired in Step S11 is not the upper limit connection number ("No" of S12).

In Step S12, in a case in which it is determined that the acquired connection number is the upper limit connection number ("Yes" of S12), the switching unit 11*b* determines whether or not the MAC address received by the NFC communication unit 13 is matched with the MAC address stored in the storing unit 14 (Step S13). That is, the switching unit 11*b* determines whether or not the terminal device which is NFC-touched is the terminal device 2 registered in advance. The switching unit 11*b* moves the process to Step S14, in a case in which it is determined that the MAC address received by the NFC communication unit 13 is matched with the MAC address stored in the storing unit 14 ("Yes" of Step S13). Meanwhile, in a case in which it is determined that the MAC address received by the NFC communication unit 13 is not matched with the MAC address stored in the storing unit 14 ("No" of Step S13), the switching unit 11*b* finishes the process of the flow chart.

In Step S13, in a case in which the switching unit 11*b* determines that the MAC address received by the NFC communication unit 13 is matched with the MAC address stored in the storing unit 14 ("Yes" of Step S13), the switching unit 11*b* and the wireless communication unit 12 perform a switching process of the wireless network (Step S14).

Figure 10:
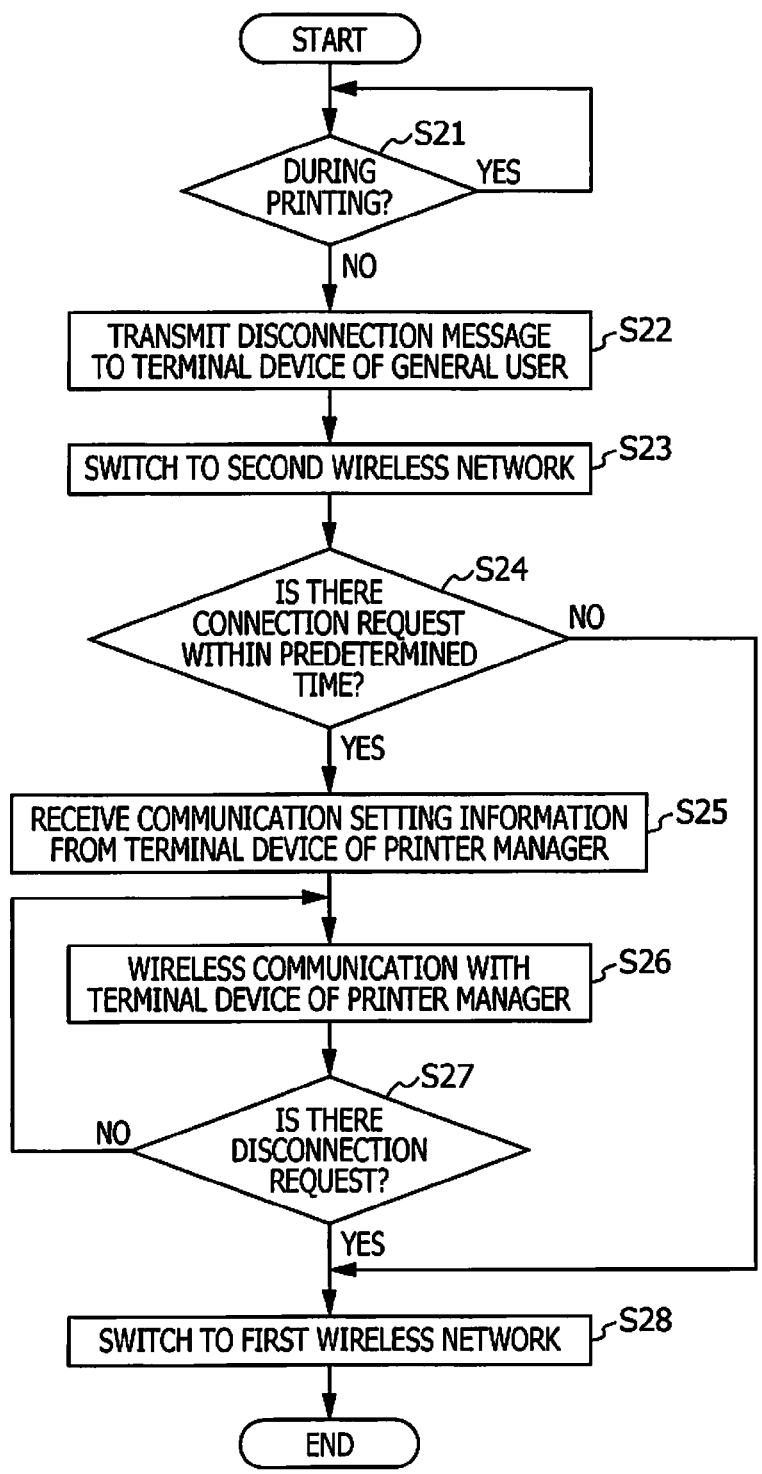
FIG. 10 is a second flow chart illustrating an operation example of the switching unit and the wireless communication unit of the printer.

FIG. 10 is a second flow chart illustrating an operation example of the switching unit 11*b* and the wireless communication unit 12 of the printer 1. The flow chart illustrated in FIG. 10 illustrates a detailed processing example of Step S14 of the flow chart of FIG. 9.

First, the switching unit 11b determines whether or not the printing unit 17 is in printing (Step S21). That is, the switching unit 11b determines whether or not printing is finished by a printing request of the terminal devices 3a to 3d which perform the wireless communication with the printer 1. The switching unit 11b repeats a process of Step S21, in a case in which it is determined that the printing unit 17 is in printing ("Yes" of S21). The switching unit 11b moves the process to Step S22 in a case in which it is determined that the printing unit 17 is not in printing ("No" of S21).

In Step S21, in a case in which it is determined that the printing unit 17 is not in printing ("No" of S21), the switching unit 11b transmits a message for indicating disconnection of the wireless connection to the terminal devices 3a to 3d which are currently connected (Step S22). The message is transmitted to the terminal devices 3a to 3d by the wireless communication of the wireless communication unit 12.

Next, the switching unit 11b controls the wireless communication unit 12, and switches the first wireless network which is currently formed to the second wireless network (Step S23).

Next, the wireless communication unit 12 determines whether or not there is a connection request from the terminal device 2 to the second wireless network within a predetermined time (Step S24). The wireless communication unit 12 moves the process to Step S28, in a case in which it is determined that there is no connection request from the terminal device 2 to the second wireless network within a predetermined time ("No" of S24). The wireless communication unit 12 moves the process to Step S25, in a case in which it is determined that there is a connection request from the terminal device 2 to the second wireless network within a predetermined time ("Yes" of S24).

In Step S24, in a case in which it is determined that there is a connection request from the terminal device 2 to the second wireless network within a predetermined time ("Yes" of S24), the wireless communication unit 12 receives the communication setting information from the terminal device 2 (Step S25). For example, the wireless communication unit 12 receives the SSID and the passphrase of the second wireless network from the terminal device 2.

Next, the wireless communication unit 12 performs the wireless communication with the terminal device 2 (Step S26).

Next, the wireless communication unit 12 determines whether or not there is a disconnection request of the wireless connection from the terminal device 2 (Step S27). In a case in which it is determined that there is no disconnection request of the wireless connection from the terminal device 2 ("No" of S27), the wireless communication unit 12 moves the process to Step S26. In a case in which it is determined that there is a disconnection request of the wireless connection from the terminal device 2 ("Yes" of S27), the wireless communication unit 12 moves the process to Step S28.

In Step S27, from the terminal device 2, in a case in which it is determined that there is the disconnection request of the wireless connection ("Yes" of S27), or in a case in which there is no connection request within a predetermined time in Step S24 ("No" of S24), the wireless communication unit 12 switches the wireless network to the first wireless network (Step S28). Also, the wireless communication unit 12 finishes the process of the flow chart.

Figure 11:
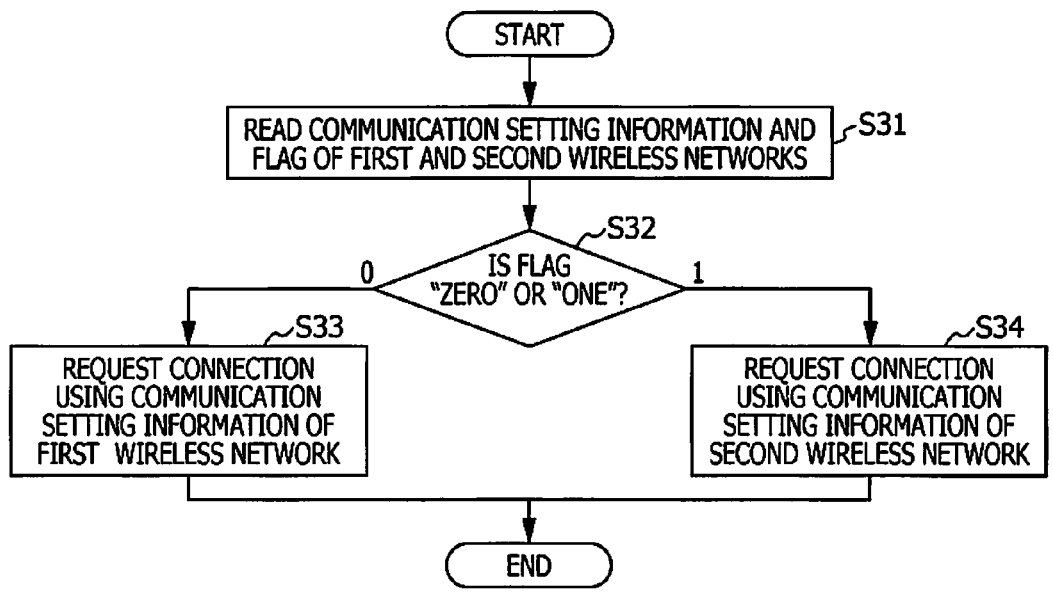
FIG. 11 is a flow chart illustrating an operation example of a connection request of the terminal device.

FIG. 11 is a flow chart illustrating an operation example of the connection request of the terminal devices 2, 3a, 3b, 3c, and 3d. If the terminal devices 2, 3a, 3b, 3c, and 3d perform the process of the flow chart illustrated in FIG. 11 when being NFC-touched to the printer 1.

First, the NFC communication unit 23 of the terminal devices 2, 3a, 3b, 3c, and 3d reads the SSID and the passphrase of the first wireless network, the SSID and the passphrase of the second wireless network, and the flag stored in the storage regions 13aa to 13ac of the NFC storing unit 13a of the printer 1 (Step S31).

Next, the wireless communication controller 21b of the terminal devices 2, 3a, 3b, 3c, and 3d determines whether the flag read in Step S31 is "zero" or "one" (Step S32). The wireless communication controller 21b moves the process to Step S33, in a case in which it is determined that the flag read in Step S31 is "zero" ("zero" of S32). The wireless communication controller 21b moves the process to Step S34, in a case in which it is determined that the flag read in Step S31 is "one" ("one" of S32).

In Step S32, in a case in which it is determined that the flag read in Step S31 is "zero" ("zero" of S32), the wireless communication controller 21b controls the wireless communication unit 22 so as to perform the connection request to the printer 1 using the SSID and the passphrase of the first wireless network read in Step S31 (Step S33). Also, the wireless communication controller 21b finishes the process of the flow chart.

Meanwhile, in Step S32, in a case in which it is determined that the flag read in Step S31 is "one" ("one" of S32), the wireless communication controller 21b controls the wireless communication unit 22 so as to perform the connection request to the printer 1 using the SSID and the passphrase of the second wireless network read in Step S31 (Step S34). Also, the wireless communication controller 21b finishes the process of the flow chart.

As seen from the above, the wireless communication unit 12 of the printer 1 forms any one of the first wireless network and the second wireless network, and performs the wireless communication with the terminal devices 2, 3a, 3b, 3c, and 3d. The NFC communication unit 13 performs the short distance wireless communication with the terminal devices 2, 3a, 3b, 3c, and 3d. The detection unit 11a detects the connection number of the terminal devices which perform the wireless communication with the first wireless network, and the switching unit 11b switches the first wireless network to the second wireless network based on the detected connection number. Accordingly, even when the wireless connection number of the wireless communication is the upper limit connection number, in a case in which there is a request of the wireless connection by a specific terminal device 2, the printer 1 is capable of reliably accepting the wireless connection of the terminal device 2.

Moreover, in the description above, two of the SSID and the passphrase are different in the first wireless network and the second wireless network, but any one of the SSID and the passphrase may be different.

In addition, in the description above, identification information of one terminal device is stored in advance in the storing unit 14, but the identification information of two or more terminal devices may be stored in the storing unit 14.

In addition, information other than the MAC address may be stored in the storing unit 14. For example, in the storing unit 14, information for indentifying that the terminal device which is NFC-touched is a terminal device of the printer administrator may be stored in advance.

In addition, the detection unit 11a allows the storage region 13ac of the NFC storing unit 13a to store a flag indicating whether or not the wireless communication is performed at the upper limit connection number, but may allow the storage unit to store the connection number of the terminal devices which perform the wireless communication. In this case, the terminal devices 2, 3a, 3b, 3c, and 3d determine whether or not the connection number read from the printer 1 is the upper limit connection number, and based on the detected result, perform the wireless communication using the communication setting information of any one of the first wireless network and the second wireless network.

In addition, exchanging of the communication setting information by the NFC communication is not limited to a flag manner described above. For example, in the description above, the terminal devices 2, 3a, 3b, 3c, and 3d select the communication setting information used for the wireless communication with reference to the flags; however, the printer 1 may select the communication setting information used by the terminal devices 2, 3a, 3b, 3c, and 3d, and store the information in the NFC storing unit 13a. For example, in a case in which the connection number of the printer 1 is less than the upper limit connection number, the switching unit 11b stores the communication setting information of the first wireless network in the NFC storing unit 13a. In addition, in a case in which the connection number of the printer 1 is the upper limit connection number, the switching unit 11b compares the MAC addresses, and stores, the communication setting information of the second wireless network in the NFC storing unit 13a if compared results thereof are matched. Also, the terminal devices 2, 3a, 3b, 3c, and 3d perform the wireless connection using the communication setting information stored in the NFC storing unit 13a. Moreover, in a case of this manner, the comparison process of the MAC address by the switching unit 11b is added between reading and writing of the terminal devices 2, 3a, 3b, 3c, and 3d. Meanwhile, in the flag manner described in the embodiment described above, the comparison process by the switching unit 11b is not added between reading and writing of the terminal devices 2, 3a, 3b, 3c, and 3d (for example, EB22, EB23, EB32, and EB33 of FIG. 7), and a communication time by the NFC communication can be shortened.

In addition, in the description above, the terminal device 2 reads the communication setting information, but the printer 1 may write the information in the terminal device 2.

In addition, the NFC communication unit 13 may be a NFC-reader and writer.

Second Embodiment

There is a case in which switching from the first wireless network to the second wireless network of the printer 1 requires time. In a second embodiment, a switching time required to switch the wireless networks is transmitted from the printer 1 to the terminal device 2 of the printer administrator. After the switching time received from the printer 1 elapses, the terminal device 2 performs the wireless connection to the printer 1 using the SSID and the passphrase of the second wireless network. Hereinafter, parts different from the first embodiment will be described.

Figure 12:
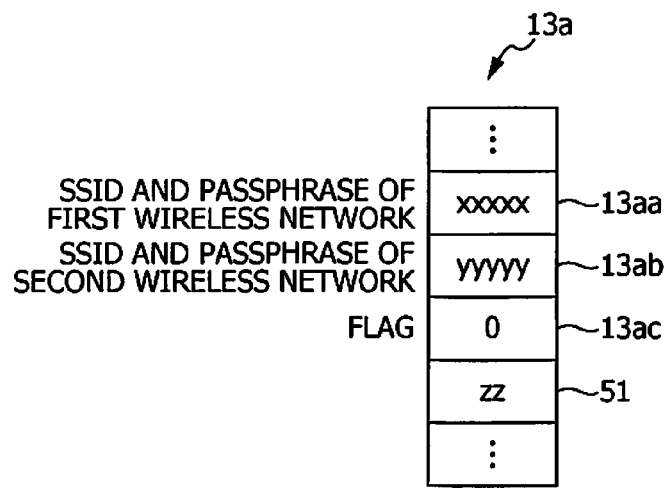
FIG. 12 is a diagram illustrating a data configuration example of an NFC storing unit according to a second embodiment of the invention.

FIG. 12 is a diagram illustrating a data configuration example of the NFC storing unit 13a according to the second embodiment of the invention. In FIG. 12, components same as those of FIG. 4 will be given the same numerals.

As illustrated in FIG. 12, switching time for switching the wireless network of the wireless communication unit 12 of the printer 1 is stored in the storage region 51 of the NFC storing unit 13a of the printer 1. The switching time stored in the storage region 51 is read through NFC-touching of the terminal device 2 of the printer administrator by the NFC communication unit 23 of the terminal device 2.

In a case in which the flag read by the NFC communication unit 23 is "one", the wireless communication unit 22 of the terminal device 2 performs the wireless connection to the printer 1 using the SSID and the passphrase of the second wireless network read by the NFC communication unit 23 after the switching time read by the NFC communication unit 23 elapses. Accordingly, the terminal device 2 does not need to attempt an unnecessary wireless connection to the printer 1.

Figure 13:
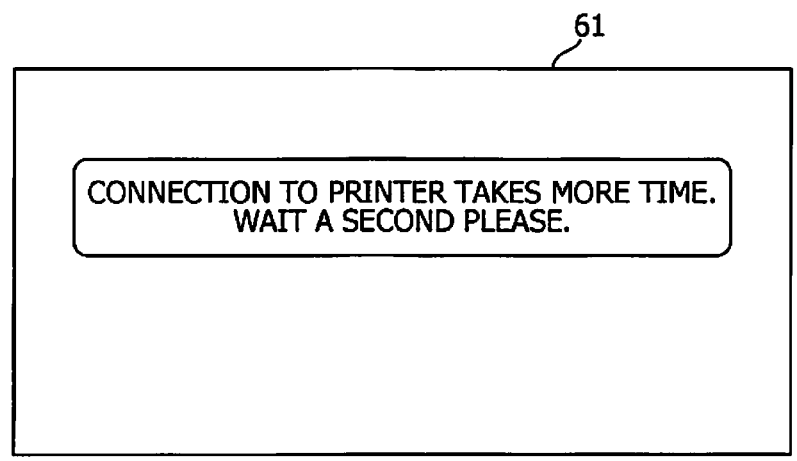
FIG. 13 is a diagram illustrating a screen example of the terminal device.

FIG. 13 is a diagram illustrating a screen example of the terminal device 2. A screen 61 illustrated in FIG. 13 illustrates a screen example which is displayed in a display device of the terminal device 2 of the printer administrator.

The outputting unit 25 of the terminal device 2 displays the screen 61 illustrated in FIG. 13 on the display device, in a case in which the flag read by the NFC communication unit 23 is "one". The outputting unit 25 displays the screen 61 on the display device, for example, for the switching time read by the NFC communication unit 23.

As described above, there is a case in which switching of the wireless networks requires a time. The printer administrator may feel anxiety if the terminal device 2 does not start the wireless communication with the printer 1, even when the terminal device 2 is NFC-touched to the printer 1.

However, as illustrated in FIG. 13, the screen 61 is displayed on the display device of the terminal device 2. Accordingly, anxiety of the printer administrator can be reduced.

Accordingly, the NFC communication unit 13 of the printer 1 transmits the switching time from the first wireless network to the second wireless network to the terminal device 2. Therefore, the terminal device 2 does not need to attempt an unnecessary wireless connection to the printer 1, and thus deterioration of power consumption can be suppressed.

Hitherto, the invention is described with reference to the embodiments, but functional configurations of the printer 1 and the terminal devices 2, 3a, 3b, 3c, and 3d are classified in accordance with main processing contents, in order to easily understand configurations of the printer 1 and the terminal devices 2, 3a, 3b, 3c, and 3d. The invention is not limited by a classifying manner or names of configuration components. Configurations of the printer 1 and the terminal devices 2, 3a, 3b, 3c, and 3d can be classified to much more configuration components in accordance with processing contents. In addition, one configuration component can be classified so as to perform much more processes. In addition, the process of each configuration component may be performed by one hard ware, or may be performed by a plurality of hard wares.

In addition, a technical range of the invention is not limited to a range disclosed in the embodiments described above. It is apparent to the skilled in the art that various modifications or improvements can be added to the above described embodiments. For example, each of the embodiments may be combined. In addition, it is apparent that embodiments to which various modifications or improvements are added can be also included in the technical range of the invention, with reference to disclosing of claims. In addition, the invention can be provided as a program realizing functions of the printer 1 and the terminal devices 2, 3a, 3b, 3c, and 3d, and a storage medium storing the program.

The electronic equipment of the invention is not limited to the printer. As the electronic equipment, equipment which implements both of short distance wireless communication and wireless LAN communication, such as a scanner, a complex machine, a projector, a television, and a video recorder, can be included.

What is claimed is:

1. An electronic equipment comprising:
a wireless communication unit that forms any one of a first wireless network corresponding to first communication setting information and a second wireless network corresponding to second communication setting information that is different from the first communication setting information, and performs wireless communication with a terminal device using the any one of a first wireless network and the second wireless network;
a short distance wireless communication unit that performs short distance wireless communication with the terminal device, the short distance wireless communication being different from the wireless communication; and
a controller that switches a network of the wireless communication which is formed by the wireless communication unit from the first wireless network to the second wireless network in response to establishing a connection of the short distance wireless communication with the terminal device while the wireless communication unit forms the first wireless network,
the controller detecting the number of connections of terminal devices which perform the wireless communication in the first wireless network, and switching the first wireless network to the second wireless network based on the detected number of connections.

2. The electronic equipment according to claim 1,
wherein, in the wireless communication unit, an upper limit connection number, which is the upper limit of the number of terminal devices with which the wireless communication unit can perform the wireless communication in the first wireless network, presents, and
wherein the controller switches the first wireless network to the second wireless network in a case in which the number of connections is equal to the upper limit connection number.

3. The electronic equipment according to claim 1,
wherein the controller switches the first wireless network to the second wireless network, in a case in which the number of connections is equal to the upper limit connection number, and a terminal device which performs the short distance wireless communication with the short distance wireless communication unit is a specific terminal device.

4. The electronic equipment according to claim 1,
wherein the short distance wireless communication unit transmits the first communication setting information for connection to the first wireless network, the second communication setting information for connection to the second wireless network, and reference information indicating which of the first communication setting information and the second communication setting information needs to be referred to by the terminal device, to the terminal device.

5. The electronic equipment according to claim 4,
wherein the controller sets the reference information such that the terminal device is instructed to refer to the second communication setting information, in a case in which the number of connections is equal to the upper limit connection number.

6. The electronic equipment according to claim 1,
wherein the short distance wireless communication unit transmits a switching time for switching from the first wireless network to the second wireless network to the terminal device.

7. The electronic equipment according to claim 1,
wherein the controller switches the second wireless network to the first wireless network, in a case in which the wireless communication with the terminal device in the second wireless network is disconnected.

8. The electronic equipment according to claim 1,
wherein the controller disconnects the wireless communication in the first wireless network which is formed by the wireless communication unit and switches the network of the wireless communication from the first wireless network to the second wireless network which is formed by the wireless communication unit so as to perform the wireless communication with the terminal device in the second wireless network, in response to establishing the connection of the short distance wireless communication with the terminal device while the wireless communication unit forms the first wireless network.

9. A terminal device comprising:
a wireless communication unit that performs wireless communication with electronic equipment;
a short distance wireless communication unit that receives first communication setting information for connection to a first wireless network formed by the electronic equipment, second communication setting information for connection to a second wireless network, and reference information indicating which of the first communication setting information and the second communication setting information needs to be referred to depending on the number of connections of terminal devices which perform the wireless communication in the first wireless network, from the electronic equipment through the short distance wireless communication; and
a wireless communication controller that controls the wireless communication unit so as to perform the wireless connection to the electronic equipment using the first communication setting information in a case in which the reference information is information indicating referring to the first communication setting information, and controls the wireless communication unit so as to perform the wireless connection to the electronic equipment using the second communication setting information in a case in which the reference information is information indicating referring to the second communication setting information.

10. A non-transitory computer-readable recording medium storing a program which causes a computer to:
receive first communication setting information for connection to a first wireless network formed by electronic equipment, second communication setting information for connection to a second wireless network, and reference information indicating which of the first communication setting information and the second communication setting information needs to be referred to depending on the number of connections of terminal devices which perform a wireless communication in the first wireless network, from the electronic equipment through short distance wireless communication; and
control a wireless communication unit so as to perform wireless connection to the electronic equipment using the first communication setting information in a case in which the reference information is information indicating referring to the first communication setting information, and control the wireless communication unit so as to perform the wireless connection to the electronic equipment using the second communication setting information in a case in which the reference information is information indicating referring to the second communication setting information.

* * * * *